United States Patent [19]

Loehrke

[11] Patent Number: 5,136,522
[45] Date of Patent: Aug. 4, 1992

[54] STOCK DIVIDING METHOD AND APPARATUS FOR GEAR MANUFACTURING MACHINE

[75] Inventor: John M. Loehrke, Canandaigua, N.Y.
[73] Assignee: The Gleason Works, Rochester, N.Y.
[21] Appl. No.: 538,811
[22] Filed: Jun. 13, 1990
[51] Int. Cl.$^5$ .................. G05B 19/18; B24B 49/00
[52] U.S. Cl. .................. 364/474.06; 51/105 GG; 51/165.71; 51/165.87; 51/95 GH; 364/474.17; 364/474.35
[58] Field of Search .................. 364/474.35, 474.06, 364/474.02, 474.16, 474.17, 474.18, 474.37; 51/52 R, 95 GH, 105 GG, 165.71, 165.87, 165.75, 165.83, 165.88, 95 LH, 165 R; 409/61; 29/893.3–893.37

[56] References Cited

U.S. PATENT DOCUMENTS

| | | | |
|---|---|---|---|
| 3,921,338 | 11/1975 | Kedrinsky et al. | 51/105 R |
| 4,589,230 | 5/1986 | Yonemura et al. | 51/95 GH |
| 4,617,761 | 10/1986 | Miyatake et al. | 51/95 GH |
| 4,755,950 | 7/1988 | Rao | 364/474.06 |

FOREIGN PATENT DOCUMENTS

| | | |
|---|---|---|
| 3519050 | 1/1986 | Fed. Rep. of Germany . |
| 2156721 | 10/1985 | United Kingdom . |
| 2164175 | 3/1986 | United Kingdom . |

OTHER PUBLICATIONS

Bossi et al., "Gear Shaving Center for FMS", *Robotics & Computer-Integrated Manufacturing*, vol. 4, No. 1-2, 1988, pp. 149–154.

*Primary Examiner*—Joseph Ruggiero
*Attorney, Agent, or Firm*—Ralph E. Harper; Robert L. McDowell

[57] ABSTRACT

Method and apparatus for stock dividing gear-shaped workpieces mounted on the work spindle of a gear-finishing tool. A work spindle encoder provides instantaneous angular position information when the surface of leading and trailing flanks of the workpiece teeth are sensed by a probe. This instantaneous position information is used to generate two sets of measured error values which relate, respectively, to the leading and trailing flanks and which are indicative of the differences between the sensed surrfaces and the desired surfaces of a correctly-sized gear. These sets of error values are analyzed using fourier transform techniques to generate (a) a first harmonic for each set and (b) a set of modified error values for each leading and trailing flank corresponding to each respective first harmonic. The largest and smallest modified error values of each set are used to simulate the opposite sides of the largest and smallest "effective" (as different from "actual") tooth spaces of the unfinished workpiece, and these effective spacings are compared to the desired correctly-sized tooth space of a finished gear to generate a correction value for adjusting the angular position of the workpiece relative to the finishing tool prior to initiation of the finishing process. In the preferred embodiment, a non-contact probe is used for sensing the flanks of the workpiece so that the entire stock division procedure takes only a relatively few seconds.

25 Claims, 6 Drawing Sheets

STOCK DIVIDING METHOD AND APPARATUS FOR GEAR MANUFACTURING MACHINE

TECHNICAL FIELD

This invention relates to a method and apparatus for stock dividing gear-shaped workpieces being manufactured on a gear-finishing machine tool.

BACKGROUND

Gears used in drive trains which rotate at relatively high speeds, e.g., automotive and aircraft drive trains, must be manufactured with great precision. Such precision usually requires a multi-step manufacturing process in which the gear is first cut to produce teeth which are very close to the final shape desired, then removed from the cutting machine and heat-treated to harden the surface of its teeth, and thereafter placed in a finish-cutting or grinding machine to form the hardened teeth into the precise shape required, namely, with appropriate curvature and with the spacing between each pair of teeth being uniform around the gear.

The heat treating process causes the body and teeth of the gear workpiece to become distorted, resulting in tooth-to-tooth variations which must be removed during the finishing process. Also, seating and positioning of the workpiece on the work spindle varies not only from machine to machine, but also between each mounting on the same machine. These variations in positioning and seating result in the radial and/or axial displacement of the axis of the gear workpiece from the axis of the work spindle, causing an asymmetrical variation in flank-to-flank spacings of the gear teeth as they are measured around the gear relative to the position of the finishing tool. This asymmetrical spacing variation is referred to as "runout." In order to produce a precision gear, the finishing tool must be able to remove all such heat-treat distortion and runout variation. Therefore, it is essential that the partially-processed gear be positioned relative to the finishing tool (e.g., grinding wheel) in a manner so that each flank of the workpiece will be contacted and shaped by the tool during the finishing process.

Of course, prior to any final machining, a gear-shaped workpiece must be appropriately "stock divided," i.e., the teeth of the partially finished gear must be positioned properly relative to the tool prior to the initiation of the finishing cycle. Traditionally, such stock division has been accomplished manually by skilled operators or, sometimes, automatically by mechanical means, such as, by inserting a ball-shaped probe into a tooth space of the workpiece gear to rotate it into an appropriate position relative to the grinding wheel. More recently, with the advent of sophisticated electronic equipment, stock division is being performed with the assistance of very sensitive contact or proximity (non-contact) probes which accurately measure the relative position of the flanks of the rough-cut gear teeth, such measurements being delivered to appropriate electronic computing apparatus where it is stored, processed, and used to generate control signals for automatically setting the relative position of the tool and workpiece prior to the initiation of the machining operation.

As measuring equipment has become more sophisticated and accurate, so has the process of stock division. In one known method, following the mounting of the work gear on the machine tool, but prior to initiating the final grinding process, a machine-mounted contact probe is moved into the space between two adjacent teeth of the work gear. The work gear is then rotated in one direction until the flank of one of the adjacent teeth activates the probe, and the angular position of the work gear is then registered in a computer. Next, the gear is rotated in the opposite direction until the flank of the adjacent tooth activates the probe, and the angular position of the gear is again registered in the computer. The difference between these two angular positions is then computed, and then the gear is rotated under computer control back half the distance toward the first-measured flank. At this point, the position of the probe precisely indicates the center of the tooth slot. The grinding wheel is then positioned relative to the work gear based upon this information.

However, as indicated above, the distortions caused by heat treatment are not uniform, and so in order to achieve more precise stock division, the prior art process just described above is repeated in a plurality of tooth slots located around the work gear, and the successive measurements are combined to compute an average value which is then used to determine the initial position of the grinding wheel relative to the gear.

The precision of this prior art stock division process varies directly with the number of tooth spaces measured by the probe, the highest accuracy being attained when all of the tooth spaces are measured and averaged for the final computation. Of course, the more tooth spaces probed, the longer it takes to complete such stock division, and, in order to reduce production costs, it is desirable to minimize the number of spaces being measured. However, because the flanks of the workpiece teeth may have very irregular errors due to heat treat warping, the accuracy of the finished part may be seriously affected if the particular flanks randomly selected for measurement do not include the "worst case" tooth space.

Other prior art stock division systems use a variety of different means for measuring the flanks of the workpiece. Some compare the workpiece to a correctly dimensioned reference part, i.e., a "master" gear, which is first mounted in the machine tool, each of its tooth spaces being measured with a probe or, in some systems, measured by a geared wheel which intermeshes with the master gear and either rotates the master gear or is rotated by it. These master gear measurements, (e.g., the spacings between the successive teeth of the master gear as measured by the probe, or the pulses generated by the geared measuring wheel as it rotates with the master gear) are stored in a computer and, thereafter, compared to similar measurements made with each workpiece, the initial position of the grinding wheel relative to the workpiece being selected in accordance with the differences between the master gear information and that measured on the workpiece.

While there are many known prior art systems for stock dividing gear-shaped workpieces, there remains a definite need for improvement, namely, a system which not only positions the workpiece so that it can be properly and precisely finished, but one that also accomplishes this goal in a relatively fast and, therefore, less costly manner.

SUMMARY OF THE INVENTION

The stock division systems disclosed herein make special recognition of an interesting fact: Namely, it has been noted from experience in measuring the tooth flanks of heat-treated gear workpieces that runout errors generally have a magnitude which is several times larger than the distortion errors caused by heat treatment. Accordingly, my stock division systems correct workpiece position on the basis of runout errors, and this adjustment encompasses and adjusts for other distortion errors as well.

The preferred apparatus of the invention uses a non-contact type probe for measuring the flanks of the workpiece. Such probes are well known, using electric or magnetic fields, air jets, or light beams to generate trigger signals whenever the flank of a workpiece passes within some predetermined distance from the probe. The work spindle of the machine is encoded to indicate its angular position in units of relative measurement, e.g., providing 36,000 equally-spaced signals for each revolution of the spindle. When the workpiece is mounted on the work spindle, the probe is brought into proximity with the toplands of the teeth and the spindle is rotated to move the flanks of the workpiece successively past the probe. As each flank passes within a predetermined distance from the probe, the probe generates a trigger signal which, in turn, causes the instantaneous position of the spindle, as indicated by the encoder, to be stored in a computer memory. In this manner, the position of each leading and trailing flank of the workpiece teeth is determined. Although probing of the flanks of all teeth is preferred, a minimum of a set of three leading flanks and a set of three trailing flanks is required for the process of the present invention with the flanks in each set being approximately angularly equidistant from each other. These instantaneous position signals are then compared with flank-to-flank spacings which have been previously either theoretically-calculated or measured from a master gear and stored in the computer, and a measured error value is then computed for each compared flank of the workpiece.

As noted above, runout errors are usually significantly greater than the distortion errors of the workpiece teeth and, therefore, in almost all cases the measured error values indicate a basic underlying sinusoidal variation about the circumference of the workpiece. Of course, this runout variation is superimposed upon other tooth shape and spacing errors. These measured error values are then analyzed in a microprocessor, and a fourier transform is used to generate a first harmonic of the measured error values. This first harmonic is indicative of the runout error in the workpiece.

The computer then generates a set of modified error values for each tooth flank corresponding to the first harmonic. That is, the resulting modified error values represent only the runout variation, and they do not include that portion of each measured error value that was caused by distortion and other gear processing errors. These modified values are then used to generate a correction signal for adjusting the relative stock position of the work spindle prior to initiating the finishing of the workpiece. In this manner, the workpiece is stock divided only in accordance with the significant runout errors, and this adjustment is not skewed by the less significant and randomly-occurring distortion errors.

Of course, in some cases the distortion errors may be so large as to require special attention. Therefore, the disclosed systems anticipate this possibility in the following manner: Prior to generating the correction signal referred to above, the computer first subtracts the modified error values (those corresponding to runout) from the measured error values (representing the measured error of each tooth flank) to produce a set of adjusted error values which are then compared with predetermined limits. If the adjusted error values indicate that the non-runout error present for any particular flank is greater or less than, respectively, predetermined upper and lower limits, this indicates that a workpiece may not be capable of being properly finished, and so the computer generates a special signal. If the error indicates that a flank is so undersized that it will not be contacted and properly shaped by the finishing tool, an abort signal is provided. On the other hand, if a tooth flank is significantly oversized, this may indicate that more than one pass of the grinding wheel may be required in order to finish the tooth properly, and so a special finishing signal is generated. In some instances, the adjusted error signal may be extremely large, indicative of a chip or burr, and in such cases the abort signal is given.

While the modified error values (corresponding to runout only) can be averaged or used in other ways to generate the desired correction value, the preferred embodiment of the invention segregates the measured error values into two groups corresponding, respectively, to the leading and trailing tooth flanks of the workpiece Each of these groups is then analyzed using a fourier transform to generate a first harmonic and a respective set of modified error values for each flank group. The smallest modified error value for each flank group is selected, and it is assumed mathematically that these two selected errors correspond, in effect, to the opposed flanks of two successive teeth of the workpiece. A determination is then made of the relative spacing between the surfaces of these two effectively successive teeth. That is, this relative spacing value indicates the widest effective tooth space that must be appropriately contacted and shaped by the grinding wheel. By comparing this spacing to the theoretically correct flank-to-flank spacing of the finished gear product, a correction value is generated in work spindle encoder units for adjusting the relative positions of the tool and workpiece to assure that all of the teeth of the workpiece will be appropriately contacted and shaped.

It will be appreciated that when the modified error spacing referred to above is compared to the theoretically correct flank-to-flank spacing, the excess stock represented by the difference in these figures need not necessarily be divided equally on each side of the "widest" workpiece slot. Preferably, the computer also selects the largest modified error value for each flank group and, similarly, assumes mathematically that these two values correspond, in effect, to the opposed flanks of two other successive teeth of the workpiece, and a determination is made of the relative spacing between these effectively opposed surfaces. This measurement indicates the "narrowest" effective workpiece slot, i.e., the maximum amount of stock which remains to be removed from each of the most oversized flanks, and this information is used for selecting a stock division position in which the load on the finishing tool is optimally balanced insofar as that is possible within the minimum limits set by the size of the widest effective tooth space as initially determined in the manner summarized above.

Special attention is called to the fact that this invention provides stock division which not only assures that each flank of the workpiece will be properly contacted and shaped by the tool but, also, that this can be accomplished in a remarkably short time. That is, the system can use a non-contact probe and thereby make the initial error measurements within the few seconds required for the spindle to rotate the workpiece past the probe, the desired correction adjustment being calculated thereafter by the computer in fractions of a second.

It is to be clearly understood that the present invention is not limited to the use of non-contact probes. Contacting-type probes such as the touch-trigger type may also be utilized to indicate the positions of the flanks of a workpiece. Although the speed of the probing would be somewhat slower with the contact probe, the calculations would be unchanged and the desired correction adjustment would be arrived at in the same manner as with the non-contact probe.

DRAWINGS

FIG. 3(a) is a schematic representation of the first, fifth, tenth, fifteenth, and twentieth teeth of a twenty-tooth workpiece, the graphically shaded portion of each tooth flank indicating that portion which must be removed to leave a theoretically correct surface;

FIG. 3(b) graphically illustrates the rectified output of the non-contact probe means as the teeth shown in FIG. 3(a) pass in proximity to the probe, the rising and falling signals for each tooth being measured in relative (as different from cumulative) work spindle position units;

FIGS. 3(c) and (d) show, respectively, the relative number of spindle units by which each rising and falling signal shown in FIG. 3(b) differs from the ideal spacing for the leading and trailing flanks of a theoretically correct tooth as represented in FIG. 3(a);

DETAILED DESCRIPTION OF PREFERRED EMBODIMENTS

Figure 1:
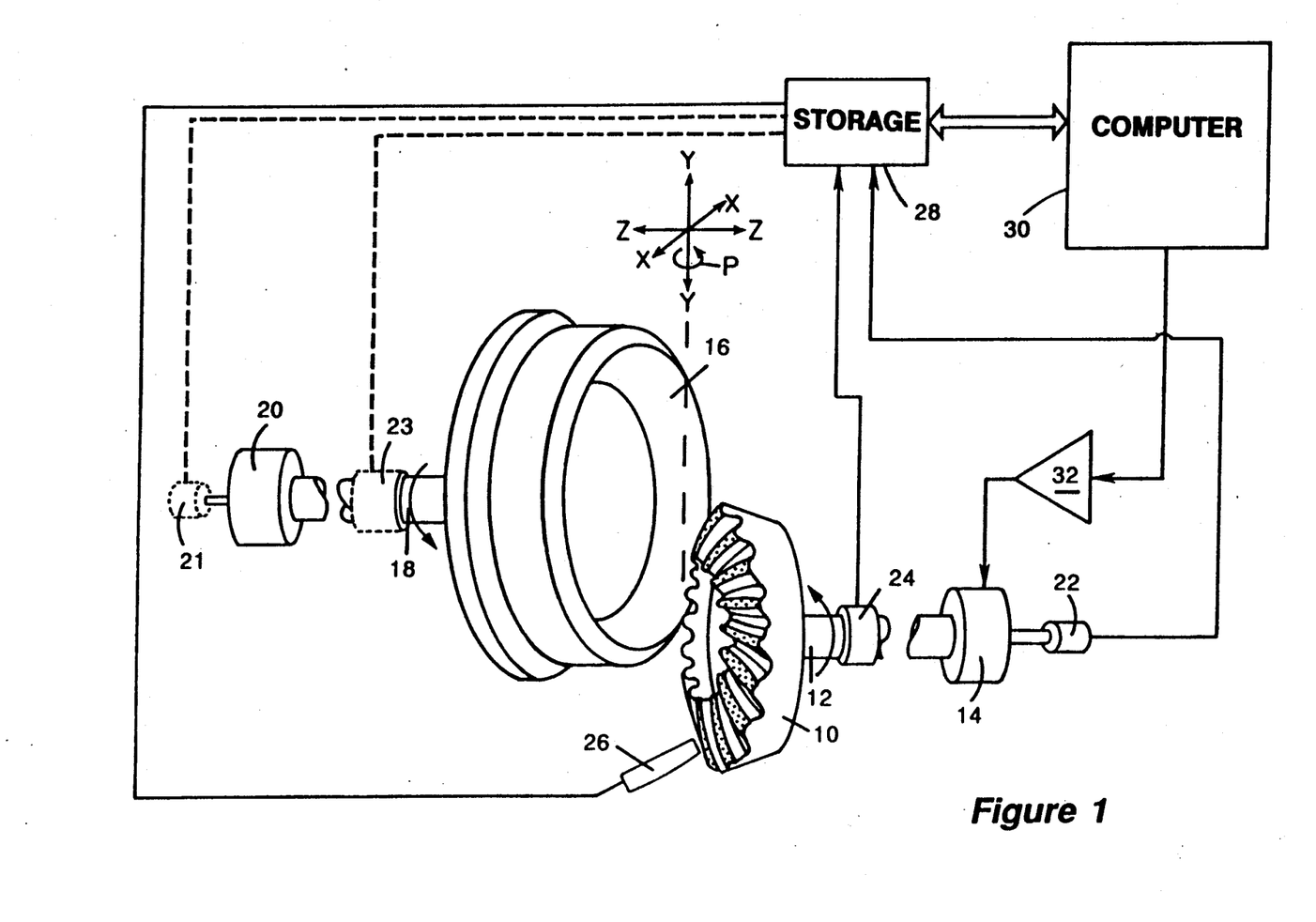
FIG. 1 is a schematic and block diagram illustrating the apparatus of the invention.

FIG. 1 shows the apparatus of the invention applied to a face milling-type machine tool for hard finishing bevel and hypoid gears. It will be appreciated that the invention is similarly applicable to face hobbing-type machine tools for manufacturing both spur and helical (parallel axis) gears and bevel and hypoid (crossed axis) gears. However, such other systems are more complex to explain and illustrate, and limiting the exemplary disclosure of the invention to a face milling-type machine should not, in any way, affect a full understanding of my stock division system by those skilled in the art.

A pre-cut bevel gear workpiece 10 is mounted on a work spindle 12 driven by a motor 14. The tool 16 is a cup-shaped grinding wheel mounted on a tool spindle 18 which, in turn, is driven by a motor 20.

For indicating the angular position of workpiece 10, a work spindle encoder 22 is mounted on the shaft of motor 14, and if work spindle 12 is not driven directly by motor 14 but rather is driven indirectly through a gear train, a further work spindle encoder 24 monitors the position of spindle 12. (It will be understood that, as indicated in dotted lines on FIG. 1, face hobbing-type machine tools would have similar encoding means 21, 23 provided for determining the angular position of motor 20, tool spindle 18, and tool 16. However, the angular position of grinding wheel 16 is not of concern in the preferred embodiment illustrated.)

When mounted on their respective spindles, workpiece 10 and tool 16 are set and then moved relative to each other, in the manner well known in the art, along vertical axis Y—Y, horizontal axes X—X and Z—Z, and as indicated by arrow P, about a vertical axis passing through their mesh point. It will be appreciated that relative movements along one or more of these axes is required to manufacture the correct finished shape of the surfaces of workpiece 10, and that, at the initiation of this finishing process, there is a predetermined relative "stock division" position for work spindle 12 and tool spindle 18 along all of these various axes which will assure that the working surfaces of cup-shaped grinding wheel 16 will be conjugate with the correctly-sized tooth spaces of workpiece 10 when it is finished.

A non-contact probe 26 is positioned in proximity to the toplands of the teeth of workpiece gear 10 and, as indicated earlier, probe 26 provides a trigger signal as each successive leading and trailing tooth flank of the workpiece passes within a predetermined distance from probe 26. Electronic storage means 28 receives position information from encoder 22 (or encoder 24) whenever a trigger signal is sent to storage means 28 by proximity probe 26, and each of these instantaneous position values is temporarily stored.

Storage means 28 also receives and stores information corresponding to the theoretically correct flank-to-flank spacing of a correctly-sized gear workpiece. This correct spacing measurement is either determined mathematically from formulas defining the gear's shape or, prior to installing workpiece 10 on the machine, a "master" gear is first mounted on spindle 12 and the positions of each leading and trailing tooth flank of this reference gear are received and stored in storage means 28.

The stored instantaneous position signals of work spindle 12, corresponding to a preselected point on each leading and trailing flank of the successive teeth of workpiece 10, are then compared with the stored correct flank-to-flank spacings by a microprocessor-type computer 30 which also calculates a desired correction signal in a manner which will be explained below. This correction signal is sent through an amplifier 32 to motor 14 to adjust the angular position of work spindle 12 and workpiece 10 relative to the working surfaces of cup-shaped grinding wheel 16.

Figure 2:
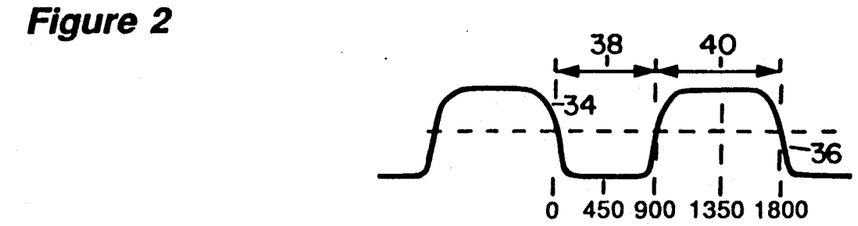
FIG. 2 is a graphic representation of the ideal theoretical tooth spacing of a finished gear, the spacing being measured in work spindle encoder units.

For purposes of the following explanation, it will be assumed that encoder 24 provides 36,000 equally-spaced signals for each revolution of work spindle 12 and, further, that gear-shaped workpiece 10 has 20 teeth. It will also be assumed that, when correctly finished, the theoretically correct spacing of the teeth of workpiece 10 are as shown in FIG. 2. That is, the distance from a trailing flank 34 of one correctly-sized tooth to the trailing flank 36 of the next successive correctly-sized tooth is exactly 1,800 spindle units (1/20 of 36,000). Again, for simplicity it will be assumed that the width 38 of each correct flank-to-flank tooth space is 900 spindle units, and that the width 40 of each correctly-sized tooth is also 900 spindle units. Of course, the flanks of the teeth are curved surfaces, and so these measurements are made at a predetermined point on that curved surface below the toplands of the teeth. This information corresponding to the tooth spacing of a correctly-sized gear workpiece is preloaded into storage means 28.

Figure 3:
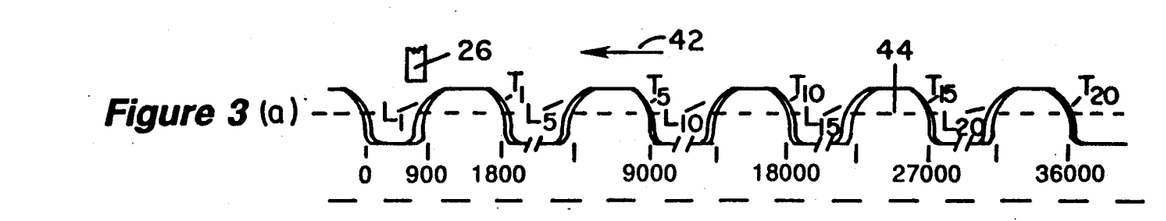

FIG. 3(a) schematically represents five selected teeth of workpiece 10, the shaded portions of each of the illustrated teeth being indicative of stock which must be removed from the respective flanks of the teeth in order to leave them with correct tooth spacing when finished. In FIG. 3(a), it is assumed that the teeth of workpiece 10 are being rotated in the direction of arrow 42 past non-contact probe 26. FIG. 3(b) represents schematically the rectified output of probe 26 which, in effect, changes direction whenever a flank of the workpiece passes within a predetermined distance represented by the dashed line 44 in FIG. 3(a). Also shown in FIG. 3(b) are the instantaneous positions received from encoder 24 at the instant that the trigger signals from probe 26 indicates the passing of each respective tooth flank being illustrated. It will be appreciated that the actual position values are work spindle encoder counts accumulating continually from zero through 36,000, as indicated in FIG. 3(a), but for purposes of clarity, in the remaining drawings it is assumed that the encoder count begins with zero and goes only to 1,800 for each tooth and then starts over again for the next successive tooth, etc.

FIGS. 3(c) and (d) indicate, respectively, the differences, in spindle units, between the instantaneously-sensed position of each monitored flank and its respective ideal position following the finishing process, these values representing the stock that must be removed from each respective tooth flank to produce a properly finished gear. Parenthetically, attention is called to a further simplification which has been used in the drawings to facilitate description of the invention. The actual spindle values are modified. Namely, it should be noted that the "0" position of the spindle is arbitrarily shown as being aligned with a theoretically correct trailing flank. Those skilled in the art will appreciate that the encoder count would actually begin on the first falling signal representing the actual oversized surface of the workpiece tooth, and that each of the following actual readings would merely change relative to that initially sensed surface. However, use of these actual readings would make the exemplary encoder counts unnecessarily complex, and use of the relatively adjusted position values does not change in any way the validity of the calculations and the resulting corrections explained below. That is, the relative tooth-to-tooth measurements, the graphs, etc., all remain exactly the same as they would be if the actual, computer-calculated position values had been used.

FIG. 3(a) illustrates only the 1st, 5th, 10th, 15th and 20th teeth of workpiece 10 but, of course, non-contact p/robe 26 provides a trigger signal for each successive flank of workpiece 10 and instantaneous position signals are recorded for each of these flanks, and measured error values, similar to those shown in FIGS. 3(c) and 3(d) are generated for each of the twenty leading and trailing flanks of the workpiece. These sets of measured error signals are shown plotted in FIG. 4. The center of the graph represents the theoretical center of each correctly-sized tooth, while the two dashed lines represent the trailing and leading edges of a correctly-sized tooth (see FIG. 2) with the relative encoder count in spindle units for each such tooth being shown in parentheses.

Figure 4:
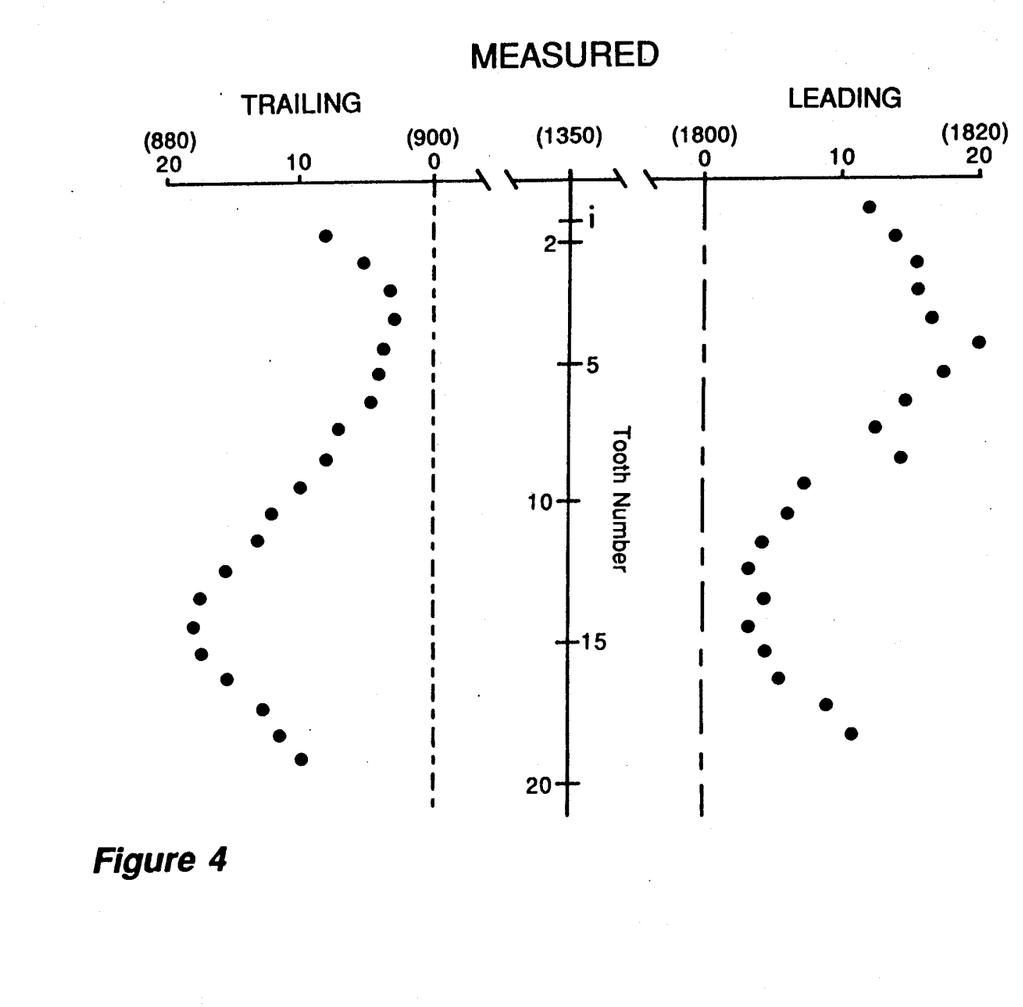
FIG. 4 is a graphic representation of measured error values for the trailing and leading flanks of each of the twenty teeth of the same twenty-tooth gear workpiece shown partially in FIG. 3(a)

It can be seen that the plots for each of these sets of measured error signals are generally sinusoidal and, according to the invention, computer 30 analyzes each of these curves using a fourier transform to generate the first harmonic of each respective curve.

Although it is preferred to probe the leading and trailing flanks of all teeth, a minimum of a set of three leading flanks and a set of three trailing flanks may be probed since a minimum of three data points is required to generate the first harmonic of the respective measured error signal curves of the leading and trailing flanks. However, it should be noted that accuracy of the present invention is increased when all tooth flanks are probed since this provides more data points from which to generate the first harmonic which in turn yields a more accurate representation of the runout in the workpiece. The three leading flanks are approximately angularly equidistant from each other as are the three trailing flanks. It is preferred that only three approximately angularly equidistant teeth be probed although it is understood that the leading flanks of three angularly equidistant teeth could be probed to provide a set of leading flank positions and the trailing flanks of three other angularly equidistant teeth could be probed to provide a set of trailing flank positions.

Figure 5:
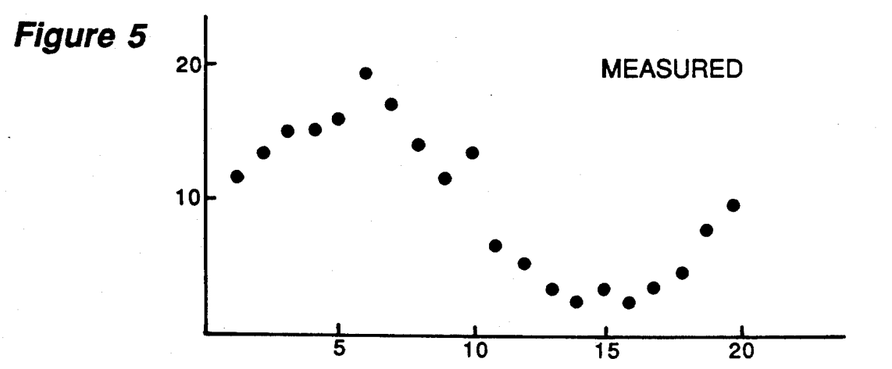
FIG. 5 is a graphic representation of the measured error values for each of the leading flanks of the workpiece, being the same graph as that shown (in a different orientation) in the right hand portion of FIG. 4.
Figure 6:
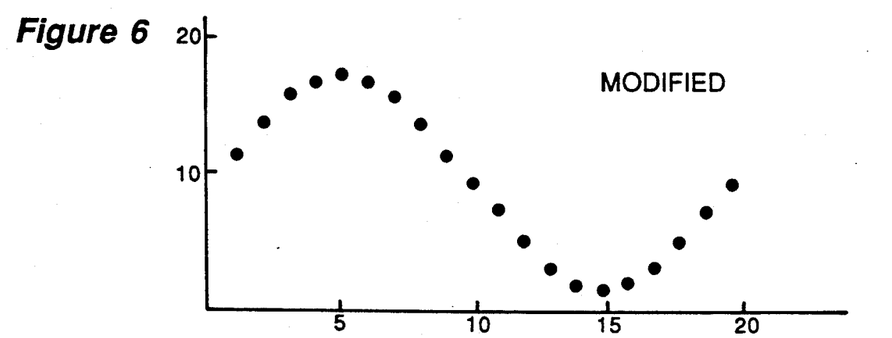
FIG. 6 is a graphic representation of the modified error values for the leading flank of the workpiece following the analysis of the errors shown in FIG. 5 using a fourier transform, such modified values being indicative of only the runout variation of each flank.
Figure 7:
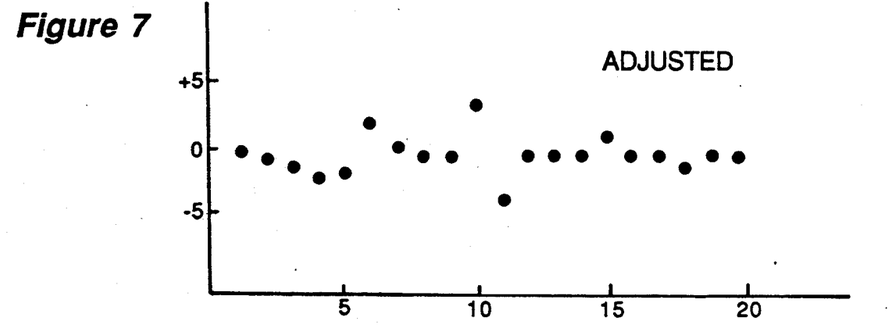
FIG. 7 is graphic representation of the measured errors shown in FIG. 5 adjusted by subtracting the modified errors of FIG. 6.

FIG. 5 shows the plot of the measured error signals for the leading flanks of workpiece 10. This is the same plot as shown in FIG. 4, but in a different orientation. FIG. 6 shows the plot of FIG. 5 after each leading flank error value has been modified to conform with the first harmonic generated by the computer. In effect, FIG. 6 corresponds to the runout present in the leading flanks of workpiece 10. Computer 30 then subtracts the modified error values of FIG. 6 from the measured error values shown in FIG. 5 to produce a set of adjusted error values plotted in FIG. 7. These adjusted error values indicate distortion and other errors present in the tooth flanks, and these adjusted errors are compared by computer 30 with predetermined upper and lower limits to assure that the workpiece can be properly finished. For instance, it can be seen that the leading flanks of the 10th and 11th teeth have unusually large errors unrelated to runout. If these errors are large enough, they may indicate the presence of a chip, burr, or nick that may create special finishing problems. In such an event, an abort signal is generated to discontinue the finishing process and call attention of an operator or, in fully automatic processes, to remove the workpiece and direct it to a reject bin.

Figure 8:
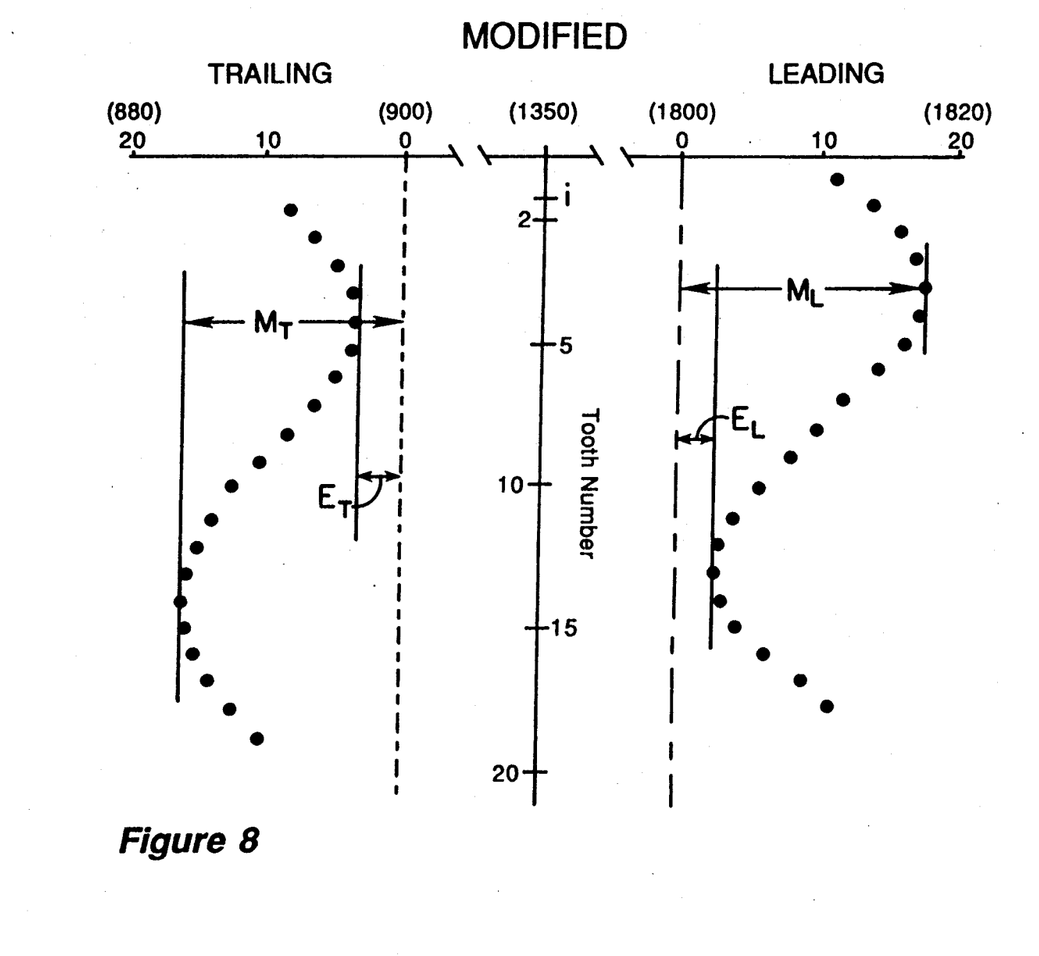
FIG. 8 is a graphic representation similar to that shown in FIG. 4 but using only the modified error signals corresponding to the first harmonic of each error set.

If review of the adjusted error signals does not result in the generation of an abort signal, the stock division process of the invention is continued using the modified (first harmonic) values for both the leading and trailing flanks. FIG. 8 is a graphic representation similar to FIG. 4 but with modified (i.e., runout) error signals plotted instead of measured error signals. Using these modified signals, a determination is made as to the maximum amount of stock that must be removed from any of the leading flanks as well as the maximum amount of stock that must be removed from any of the trailing flanks. These values are indicated as $M_L$ and $M_T$, respectively. Similar determinations are made concerning the leading and trailing flanks having the least amount of stock to be removed, and these values are indicated as $E_L$ and $E_T$, respectively. The values $E_T$ and $E_L$ are compared to the negative adjusted values (FIG. 7) to assure that enough stock remains on each flank to be contacted by the finishing tool and, thus, assure that each flank will be "cleaned-up" (i.e., shaped during the finishing process).

If the values $M_L$, $M_T$, $E_L$ and $E_T$ are superimposed over the width 38 of an ideally-sized tooth slot (FIG. 2), they indicate the theoretically largest and narrowest tooth slots which must be cleaned up by the finishing tool. This mathematical superimposition is shown graphically in FIG. 9 where the short-dash lines represent, respectively, the center line 46 and flanks 48 and 50 of a correctly-sized slot, their positions being measured in relative spindle encoder units (as in FIG. 2). The two opposed flanks having the greatest amount of stock to be removed are identified as $H_T$ and $H_L$, while the two opposing flanks with the least amount of stock to be removed are indicated, respectively, as $L_T$ and $L_L$.

In order to minimize both tool wear and the possibility of over heating the surfaces of the workpiece during the finishing process, it is desirable to balance the loads on the grinding wheel and workpiece, i.e., to remove substantially equal stock from the leading and trailing tooth flanks. However, if tool 10 is positioned at center 46 of the theoretically-correct tooth slot, it can be seen (FIG. 8) that in order to assure proper shaping of all the leading flanks, up to a maximum of 19 units of stock (900-881) will be removed, while up to a maximum of 15 units of stock must be removed from the trailing flanks. Since there is a maximum distributed total of 34 units of stock which must be removed from both sides, computer 30 is programmed to initially average this total (34/2=17) to balance the load equally at up to 17 units per side. Such balancing would be achieved by rotating the relative angular position of workpiece 10 two spindle units to the left, placing the center of the stockdivision position at 448 units instead of 450 units.

However, there obviously are limits to any such balancing adjustments. Clearly, if the adjustment called for by the averaging calculation were greater than one-half the flank-to-flank spacing of the theoretical tooth slot, it would be impossible to end up with correctly-sized teeth, and so if an adjustment calculation exceeds this limit, the stock-division process is aborted. Another limit to such adjustment of the center of the tooth slot is less extreme and is determined by the values $E_T$ and $E_L$. Namely, as indicated above, in order to assure that each flank of the workpiece will be properly cleaned up, some stock must be removed from each flank. For instance, in the example just discussed above, the balancing adjustment was determined initially to be two spindle units, using the 448-unit position as the slot center. However, if this adjustment were made, with the correct slot width being 900 spindle encoder units, the trailing-flank side of the initial stock-divided slot would be at $-2$ spindle encoder units (relative to the unit encoder counts illustrated in FIG. 9), while the leading-flank side would be at 898 units. But line $L_L$, which represents the lowest leading flank of the unfinished workpiece, is already at spindle position 898, and tool 10 would not necessarily contact this surface during the finishing process and so would not properly clean up this lowest flank.

Figure 9:
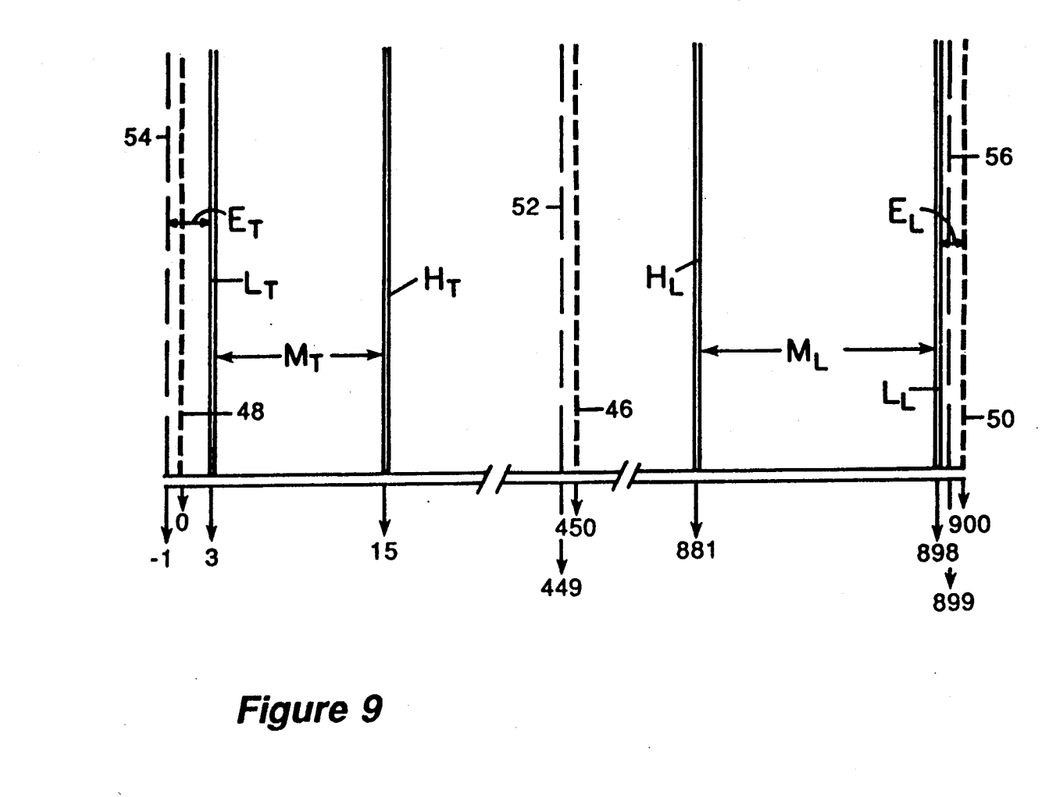
FIG. 9 is a graphic representation of the relative positions of the flanks corresponding to the largest and smallest error values in each of the respective trailing and leading sets shown in FIG. 8, these flanks being shown superimposed over a theoretically ideal tooth space; also indicated is the relative work spindle correction adjustment required to achieve an optimum balance of the stock that must be removed by the finishing tool while still assuring that all flanks will be properly contacted and shaped.

Therefore, following the balancing calculation referred to above, the computer also compares the resulting value to the limits created by $E_T$ and $E_L$. In the illustrated example, the processor then reduces the balancing calculation by one spindle encoder unit to set the adjustment value to only one spindle encoder unit to the left so that the final correction value for the stock division position is $-1$. This results in the rotation of spindle 12 relative to tool 16 to bring the center of the first slot to a relative angular position represented by 449 spindle encoder units. This corrected stock division tooth slot is shown in FIG. 9 by the long-dash lines representing the adjusted slot center 52 and adjusted flanks 54 and 56. While this position does not exactly balance the stock removal load, it does improve the load balance while still assuring that all slots will be cleaned up.

It should be noted that the stock division procedure described above only adjusts the starting position of tool 26 relative to workpiece 10. After making this initial adjustment of the slot center to the 449-unit spindle position rather than the 450-unit position, the machine indexes normally thereafter. That is, following the initial corrected setting, workpiece 10 is rotated exactly 1,800 spindle encoder units from each preceding center position for finishing the next succeeding tooth slot.

It will be appreciated that if only a few of the tooth slots of workpiece 10 had been monitored for stock division purposes, and if those few monitored slots had included the spaces between the sixth and seventh teeth or between the 10th and 11th teeth, the non-runout errors of these teeth would have skewed the calculated stock division position so that several of the tooth flanks may have been left untouched by the grinding wheel. In contrast, the invention disclosed above does not use any peak value, or even the average value, of the actually measured flanks. Instead, it uses only the significant runout error, as determined by fourier analysis, to control the automatic stock division position, thereby minimizing the possibilities of overloading the machine or of not cleaning up the workpiece. In addition, by using a non-contact probe, the stock division system disclosed herein is accomplished in a very short time.

What is claimed is:

1. A method of stock dividing for use with a machine for finishing the tooth flanks of gear-shaped workpieces, said machine having a tool mounted for rotation in a tool spindle and a work spindle for receiving and rotating said workpieces; said method comprising the steps of:

calculating the flank-to-flank spacing between preselected points on the respective teeth of a theoretical correctly-sized gear workpiece, said preselected points being located at a predetermined distance from the toplands of the teeth;

storing said theoretical flank-to-flank spacings;

determining a relative stock-division position for said tool and work spindles when said tool is positioned conjugate with a tooth space of said correctly-sized finished gear workpiece;

mounting a gear-shaped workpiece on said work spindle;

providing a probe means which is activated to generate a trigger signal whenever positioned in a predetermined location relative to a flank of said workpiece;

rotating said work spindle to move the tooth flanks of said workpiece relative to said probe means to generate an output signal indicative of the instantaneous position of the work spindle whenever the position of a tooth flank of said workpiece relative to said probe means initiates a trigger signal;

storing said instantaneous spindle positions of the workpiece tooth flanks;

comparing the stored positions of a plurality of said workpiece tooth flanks with the stored theoretical gear tooth flank positions to generate an measured error value for each compared flank of said workpiece;

analyzing said measured error values using a fourier transform to generate (a) a first harmonic of said measured error values and (b) a set of modified error values corresponding to said first harmonic;

comparing said average modified error value with said theoretical flank-to-flank spacing to generate a correction value;

adjusting said relative stock-division position of said tool and work spindles in accordance with said correction value; and initiating the finishing of the workpiece.

2. The method according to claim 1 comprising the further steps of:

subtracting said modified error values from said measured error values to provide a set of adjusted error values;

comparing said sets of adjusted error values with predetermined spacing error limits; and generating an abort signal if any adjusted error value exceeds said spacing error limits.

3. The method according to claim 1 wherein measured error values are generated for each gear tooth flank of said workpiece during said comparing step.

4. The method according to claim 1 wherein measured error values are generated for at least three leading and three trailing tooth flanks, the compared flanks being approximately angularly equidistant from each other.

5. The method according to claim 1 comprising the further steps of:

comparing said correction value to a predetermined correction limit representing no more than one-half said theoretical flank-to-flank spacing; and generating an abort signal if said correction signal is greater than said correction limit.

6. The method according to claim 1 wherein said work spindle is encoded to indicate its angular position in units of relative measurement, and wherein said theoretical flank-to-flank spacing measurements, said instantaneous spindle positions, and said error and correction values are all convertible to said work spindle measurement units.

7. The method according to claim 6 wherein said probe comprises non-contact sensor means and said rotating step comprises rotating said work spindle to cause the surface of said workpiece to move past said non-contact sensor means to generate an output signal which indicates the instantaneous position of the work spindle in work spindle units whenever a tooth flank of the workpiece passes by said sensor means at said predetermined distance.

8. The method according to claim 7 wherein, following said analyzing step, said method comprises the further steps of:

averaging said modified error values to generate an averaged modified error value;

comparing said average modified error value with said theoretical flank-to-flank spacing to generate a correction value;

adjusting said relative stock-division position of said tool and work spindles in accordance with said correction value; and initiating the finishing of the workpiece.

9. The method according to claim 8 comprising the further steps of:

subtracting said modified error values from said measured error values to provide a set of adjusted error values;

comparing said sets of adjusted error values with predetermined spacing error limits; and generating an abort signal if any adjusted error value exceeds said spacing error limits.

10. The method according to claim 8 wherein measured error values are generated for each gear tooth flank of said workpiece during said comparing step.

11. The method according to claim 8 wherein measured error values are generated for at least three leading and three trailing tooth flanks, the compared flanks being approximately angularly equidistant from each other.

12. A method of stock dividing for use with a machine for finishing the leading and trailing flanks of the teeth of gear-shaped workpieces, said machine having a tool mounted for rotation in a tool spindle and a work spindle for receiving and rotating said workpieces, said work spindle being encoded to indicate its angular position in units of relative measurement; said method comprising the steps of:

calculating the flank-to-flank spacing between preselected points on successive teeth of a theoretical correctly-sized gear workpiece, said preselected points being located at a predetermined distance from the toplands of the teeth, and said spacing measurements being converted into work spindle units;

storing said theoretical flank-to-flank spacings;

determining a relative stock-division position for said tool and work spindles when said tool is positioned conjugate with a tooth space of said correctly-sized finished gear workpiece;

mounting a gear-shaped workpiece on said work spindle;

rotating said work spindle to cause the surface of said workpiece to move past non-contact sensor means to generate an output signal which indicates the instantaneous position of the work spindle in work spindle units whenever a tooth flank of the workpiece passes by said sensor means at said predetermined distance;

storing said instantaneous spindle positions of the workpiece tooth flanks;

comparing the stored positions of a plurality of said workpiece tooth flanks with the stored theoretical gear tooth flank positions to generate a measured error value for each compared flank of said workpiece;

segregating said measured error value into two groups corresponding, respectively, to the leading and trailing tooth flanks of the gear workpiece;

analyzing each of said measured error value groups using a fourier transform to generate (a) a first harmonic of said measured error values for each flank group and (b) a respective set of modified error values corresponding to said first harmonic;

selecting the smallest modified error value for each flank group; assuming mathematically said two smallest error values relate to the opposed flanks of two successive teeth of the workpiece to determine the relative spacing between them in work spindle units; subtracting said relative spacing from said theoretically correct flank-to-flank spacing to determine a measurement in work spindle units of the total stock which must be removed from the two flanks corresponding to said two smallest modified error values; and generating a correction value in work spindle units corresponding to a percentage of said total stock measurement;

adjusting said relative stock-division position of said work spindle in accordance with said correction value; and initiating the finishing of the workpiece.

13. The method according to claim 12 comprising the further steps of:
subtracting said modified error values from said measured error values to provide a set of adjusted error values for each flank group;
comparing said sets of adjusted error values with predetermined spacing error limits; and
generating an abort signal if any adjusted error value exceeds said spacing error limits.

14. The method according to claim 12 comprising the further steps of:
selecting the largest modified error value for each flank group;
comparing said largest modified error values to a predetermined optimum stock removal limit; and
generating a special finishing signal whenever any of said largest modified errors exceeds said optimum limit.

15. The method according to claim 12 wherein measured error values are generated for each gear tooth flank of said workpiece during said comparing step.

16. The method according to claim 12 wherein measured error values are generated for sets of at least three leading tooth flanks and at least three trailing tooth flanks, the compared flanks in each set being approximately angularly equi-distant from each other.

17. The method according to claim 12 comprising the further step of:
generating an abort signal if said relative spacing between the smallest error flanks is larger than said theoretical flank-to-flank spacing.

18. The method according to claim 12 comprising the further steps of: comparing said correction value to a predetermined correction limit representing no more than one-half said theoretical flank-to-flank spacing; and generating an abort signal if said correction value is greater than said correction limit.

19. The method according to claim 12 wherein said theoretical measuring step is replaced by the steps of:
mounting a master gear on said work spindle;
rotating said work spindle to cause the surface of said master gear to move past said non-contact sensor means to generate a value signal which indicates the angular position of the work spindle in said work spindle units when the tooth flanks of the master gear pass by said sensor means at said predetermined distance from the toplands of the gear teeth; and
using said master gear flank values in place of said theoretical flank-to-flank spacings.

20. Stock-dividing apparatus for a machine for finishing the tooth flanks of a gear-shaped workpiece, said machine having a tool mounted for rotation in a tool spindle, a work spindle for receiving and rotating said workpiece, and means for moving said spindles to respective theoretically predetermined relative stock-division positions for properly finishing said workpiece; said apparatus comprising:
a probe for generating a trigger signal whenever positioned in a preselected location relative to a flank of said workpiece;
an encoder for said work spindle for generating value signals representative of the angular position of said spindle;
storage means for receiving and storing
values representative of the position of said work spindle relative to said tool spindle when said spindles are in said theoretically proper finishing position;
predetermined theoretical values representative of the flank-to-flank spacing of the teeth of a correctly-sized gear workpiece measured between predetermined points related to the preselected location of said probe relative to said workpiece and to said predetermined distance, said spacing measurement signals being convertible to work spindle units; and
instantaneous position values from said encoder whenever a trigger signal is generated by said probe;
a microprocessor programmable for
providing measured error values for said tooth flanks representative of the difference between said theoretical values and said instantaneous values;
analyzing said measured error values using a fourier transform to (a) determine a first harmonic of said measured error values and to (b) generate a set of modified error values, corresponding to said first harmonic; and
comparing said average modified error
values with said theoretical flank-to-flank spacing to generate a correction value in work spindle units;
said means for moving said work spindle being responsive to said correction value for adjusting said relative stock-division position of said work spindle in accordance with said correction value.

21. The stock-dividing apparatus of claim 20 wherein said probe is a non-contact sensor positioned in a preselected relation to said workpiece and in proximity to the teeth of said workpiece for indicating whenever one of said tooth flanks is rotated past it at a predetermined distance.

22. The stock-dividing apparatus of claim 20 wherein said microprocessor is further programmable for
  averaging said modified error values to generate an average modified error value; and
  comparing said average modified error value with said theoretical flank-to-flank spacing to generate said correction value in work spindle units.

23. Stock-dividing apparatus for a machine for finishing the leading and trailing flanks of the teeth of a gear-shaped workpiece, said machine having a tool mounted for rotation in a tool spindle, a work spindle for receiving and rotating said workpiece, and means for moving said spindles to respective theoretically predetermined relative stock-division positions for properly finishing said workpiece; said apparatus comprising:
  an encoder for said work spindle for generating value signals representative of the angular position of said spindle in units of relative measurement;
  a non-contact sensor positioned in a preselected relation to said workpiece and in proximity to the teeth of said workpiece for indicating whenever one of said leading and trailing tooth flanks is rotated past it at a predetermined distance;
  storage means for receiving and storing
    values representative of the position of said work spindle relative to said tool spindle when said spindles are in said theoretically proper finishing position;
    predetermined theoretical values representative of the flank-to-flank spacing of the teeth of a correctly-sized gear workpiece measured between predetermined points related to the preselected position of said sensor relative to said workpiece and to said predetermined distance, said spacing measurement signals being convertible to work spindle units; and
    instantaneous position values from said encoder whenever said non-contact sensor indicates the passage of a tooth flank at said predetermined distance;
  a microprocessor programmable for providing measured error values for said tooth flanks representative of the difference between said theoretical values and said instantaneous values;
  segregating said measured error values into groups representing, respectively, said leading and trailing flanks of the workpiece;
  analyzing each of said measured error value groups using a fourier transform to (a) determine a first harmonic of said measured error values and to (b) generate for each flank group a respective set of modified error values, corresponding to said first harmonic; and
  selecting the smallest modified error value for each flank group; assuming mathematically said two smallest error values relate to the opposed flanks of two successive teeth of the workpiece to determine the relative spacing between them in work spindle units; subtracting said relative spacing from said theoretically correct flank-to-flank spacing to determine a measurement in work spindle units of the total stock which must be removed from the two flanks corresponding to said two smallest modified error values; and generating a correction value in work spindle units corresponding to a percentage of said total stock measurement;
  said means for moving said work spindle being responsive to said correction value for adjusting said relative stock-division position of said work spindle in accordance with said correction value.

24. The stock-dividing apparatus of claim 23 wherein said microprocessor is also programmable for
  subtracting said modified error values from said measured error values to provide a set of adjusted error values for each flank group;
  comparing said sets of adjusted error values with predetermined spacing error limits; and
  generating an abort signal if any adjusted error value exceeds said spacing error limits.

25. The stock-dividing apparatus of claim 23 wherein said microprocessor is also programmable for
  selecting the largest modified error value for each flank group;
  comparing said largest modified error values to a predetermined optimum stock removal limit; and
  generating a special finishing signal whenever any of said largest modified errors exceeds said optimum limit.

* * * * *